Patented May 25, 1948

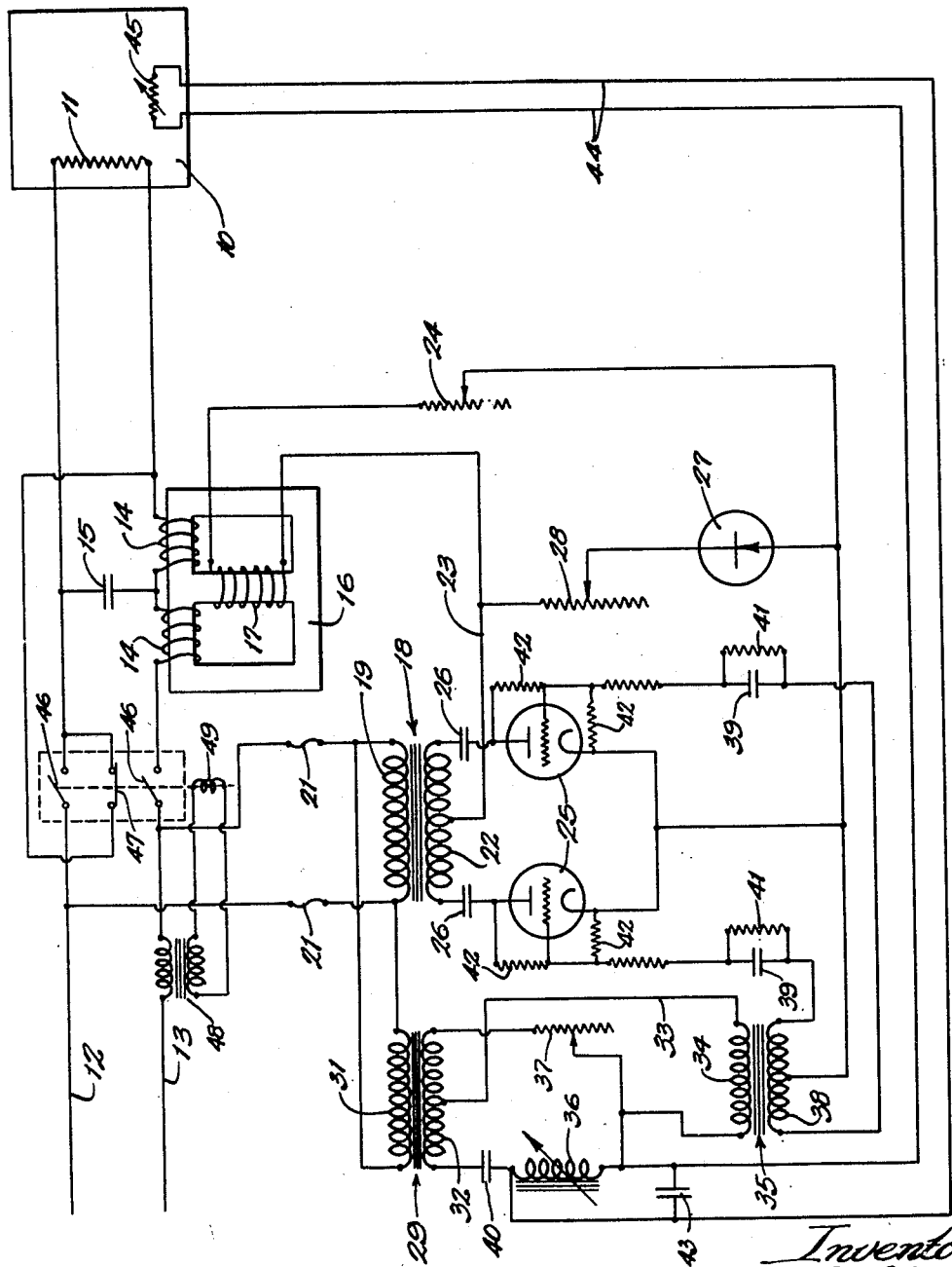

2,441,967

UNITED STATES PATENT OFFICE 2,441,967

ELECTRIC REGULATING APPARATUS

Eugene H. Haug, Chicago, Ill., assignor to La Salle National Bank, Chicago, Ill., as trustee Application July 24, 1943, Serial No. 495,981

12 Claims. (Cl. 323—89)

This invention relates to electric regulating apparatus and more particularly to apparatus for regulating the power supplied by a supply circuit to a variable load.

One of the objects of the invention is to provide electric regulating apparatus for maintaining the power supplied to a load substantially constant regardless of variations in the load.

Another object of the invention is to provide electric regulating apparatus in which the saturation of a reactor in a resonant circuit is controlled to control the power supply and also to protect the load elements.

Another object of the invention is to provide electric regulating apparatus in which control is effected through a transformer having a control circuit connected to the mid point of its secondary to produce sharp control peaks.

Still another object of the invention is to provide electric regulating apparatus in which the phase of a control circuit is shifted through a phase split circuit to produce steeper control characteristics.

Another object of the invention is to provide electric regulating apparatus employing gaseous discharge tubes which are biased negative after discharge to prevent the accumulation of cathode emission material on the grids thereby to prevent the loss of grid control.

A further object of the invention is to provide electric regulating apparatus in which a saturating winding for a reactor forming part of a resonant circuit is supplied with direct current pulses and a by-pass around the saturating winding is provided for inductive kick to protect the control circuit and to average the current flow through the saturating winding.

A still further object of the invention is to provide electric regulating apparatus in which the supply circuit may be broken without appreciable arcing.

The above and other objects and advantages of the invention will be more readily apparent from the following description when read in connection with the accompanying drawing, in which the single figure is a diagrammatic view of a regulating apparatus embodying the invention.

The invention is particularly adapted and is illustrated and described in connection with the regulation of electric heat-treating furnaces although it will be understood that other variable loads could be controlled equally well. On the drawing there is shown a furnace 10 adapted to be heated by one or more resistance elements 11 connected through the regulating apparatus to a supply circuit including wires 12 and 13. In a furnace of this type, the resistance of the elements 11 varies in accordance with their age and condition and it is desirable to supply thereto substantially constant power regardless of the resistance of the elements and voltage fluctuations in the supply circuit. The power supplied to the elements is preferably varied in accordance with the furnace requirements so that the temperature of the furnace will be held at a constant value.

To control the current to the resistance elements 11 there is provided in one of the lines shown as 13 a pair of reactance windings 14 in series with a condenser 15 connected from a point between the windings 14 to the line 12. The reactors 14 and the condenser 15 provide a T resonant circuit connected in the supply circuit between the source and the load.

The two windings 14 are wound on a common frame 16 which also carries a saturating winding 17 variably to saturate the core to vary the reactance of the windings 14. Current is supplied to the saturating winding 17 by a transformer 18 including a primary winding 19 connected through fuses 21 to the supply wires 12 and 13 at the input side of the resonant circuit. The secondary winding 22 of the transformer 18 has its mid point connected through a wire 23 to one side of the winding 17. The other side of the winding 17 is connected through an adjustable resistor 24 to the cathodes of a pair of gaseous discharge tubes 25. The plates of the discharge tubes 25 are connected through condensers 26 to the ends of the secondary 22 respectively.

In operation, the tubes 25 are caused alternately to fire and the phase position of their discharge is varied to control the amount of current supplied to the saturating winding 17. In order to prevent damage to the tube by inductive kick from the winding 17 when the current supplied thereto is interrupted, a rectifier 27 is connected in series with a resistor 28 across the winding 17. When the transformer 18 is supplying current to the winding 17 with the wire 23 forming the positive side of the circuit, no current can flow through the rectifier 27. However, when the circuit is interrupted, inductive kick in the winding 17 tends to cause the current flow to continue in the same direction and at this time the rectifier will pass the current to protect the tubes and the transformer.

The tubes 25 are controlled by a phase split control circuit including a grid supply transformer 29 whose primary winding 31 is connected to the supply wires 12 and 13 at the input side of the resonant circuit. The secondary winding 32 of the transformer 29 has its mid point connected through a wire 33 to one end of the primary winding 34 of a grid transformer 35. The other end of the winding 34 is connected through a variable reactor 36 to one end of winding 32 and through a variable resistor 37 to the opposite end of the winding 32. The secondary winding 38 of the grid transformer 35 has its mid point connected to the cathodes of the tubes 25 and the opposite ends of the winding 38 are connected through condensers 39 and resistors 41 in parallel to the grids of the tubes 25. As shown, the grids of the tubes 25 are connected through resistors 42 to their respective plates and cathodes to prevent surge voltage coupling on the grid.

With the arrangement of the condensers 39 and resistors 41 in the tube grid circuits, the grids of the tubes will be biased strongly negative during the discharge operation so that any of the active material will be prevented from collecting on the grid. Due to this arrangement secondary emission in the tubes is eliminated and the life of the tubes is substantially improved.

The phase of the control circuit is adapted to be shifted in order to vary the point of discharge of the tubes so that the current supplied to the saturating winding 17 may be varied to produce the desired regulation. For this purpose a series condenser 40 and a parallel condenser 43 are connected with the reactor 36 to compensate for excessive reactance so that the control of the phase shift circuit is made steeper. Wires 44 connect a variable resistor 45 which is responsive to the furnace temperature and whose value changes in accordance with variations in the furnace temperature across the reactor 36. As the value of the resistance 45 changes the reactance of the phase split circuit is varied accordingly. This will vary the point of discharge of the tubes 25 to vary the current supply to the saturating winding 17. This varies the reactance of the windings 14 in accordance with the degree of saturation and varies the current supplied to the heating elements 11. I have found that regulation through a phase split circuit as described provides steep control characteristics and gives a much closer regulation of the furnace temperature than other types of control.

In operation of the system as so far described, when the voltage in the supply lines 12 and 13 is constant the resonant circuit formed by the reactors 14 and condenser 15 will maintain the current supplied to the heating elements 11 at a constant value. In the event of a variation in temperature in the furnace under these conditions, the control circuit will vary the degree of saturation of the core 16 to change the value of the reactors 14 so that the current supply will be varied slightly in a direction to return the temperature of the furnace to the desired value. In the event a resistance element 11 should burn out the reactors 14 of the resonant circuit would tend to become heated to excessively high temperatures and would tend to increase the voltage to an extremely high value in an effort to maintain the output current constant. Since the current in the input side is proportional to the voltage in the output side of the resonant circuit, the current increase may be utilized to open the supply circuit. For this purpose a pair of switch contacts 46, which are preferably connected for simultaneous movement, are provided in the lines 12 and 13 and a third switch 47 is provided to short-circuit the supply at the output side of the resonant circuit. To interrupt the supply circuit the switch 47 is first closed, thereby short-circuiting the load. When this occurs, the regulator functions to decrease the current flowing through the contacts 46 and these contacts may then be opened without any substantial arcing. Therefore, in operating the switch the contact 47 is first closed prior to opening the contacts 46 and is preferably also closed prior to re-closing the contacts 46. Thus these contacts are operated at all times under relatively low current conditions so that the switch construction can be simplified. The switch is preferably controlled automatically in response to the current in the input side of the resonant circuit and to accomplish this a transformer 48 connected in one of the supply lines and supplying a coil 49 which operates the switch. When the current increases in the supply line the coil 49 will operate first to close the switch 47 and then to open the contacts 46.

The transformer 35 is a peaking transformer and is preferably also a step-up transformer to increase the voltage in the control circuit. With this construction, the tubes 25 are fired more positively and accurately and a closer control of the point of tube discharge is produced by shifting the phase position of the relatively sharp control peaks.

While one embodiment of the invention has been shown and described in detail herein it will be understood that this is illustrative only and is not to be taken as a definition of the scope of the invention, reference being had for this purpose to the appended claims.

What is claimed is:

1. Electric regulating apparatus for controlling an alternating current supply circuit connected to a variable load comprising a constant potential to constant current resonant circuit device connected in the supply circuit between the source and the load, the resonant circuit including a reactor and a condenser, a saturating winding for variably saturating the reactor of said resonant circuit, means connected to the supply circuit to supply current to the saturating winding, an electron discharge tube in the last named means to control the current to the saturating winding, a control circuit connected to the tube to control its point of discharge, a step up transformer connected to the supply circuit, and a control circuit for the tube connected to the ends and mid point of the transformer secondary winding to supply relatively sharp peaks to cause the tube to fire.

2. Electric regulating apparatus for controlling an alternating current supply circuit connected to a variable load comprising a constant potential to constant current resonant circuit device connected in the supply circuit between the source and the load, the resonant circuit including a reactor and a condenser, a saturating winding for variably saturating the reactor of said resonant circuit, means connected to the supply circuit to supply current to the saturating winding, an electron discharge tube in the last named means to control the current to the saturating winding, a control circuit connected to the tube to control its point of discharge, an electron discharge tube in the last named means to control the current to the saturating winding, a transformer connected to the supply circuit, and a control circuit for the tube connected to the ends and mid point of the transformer secondary winding to supply relatively sharp peaks to cause the tube to fire, a phase split circuit connected in the control circuit, and means responsive to a condition affected by the load to vary the phase split circuit thereby to shift the phase of the peaks in the control circuit.

3. Electric regulating apparatus for controlling an alternating current supply circuit connected to a variable load comprising a constant potential to constant current resonant circuit device connected in the supply circuit between the source and the load, the resonant circuit including a reactor and a condenser, a saturating winding for variably saturating the reactor of said resonant circuit, means connected to the supply circuit to supply current to the saturating winding, an electron discharge tube in the last named means to control the current to the saturating winding, a control circuit connected to the tube to control its point of discharge, and a rectifier connected across the saturating winding to by-pass inductive kick therefrom.

4. Electric regulating apparatus for controlling an alternating current supply circuit connected to a variable load comprising a constant potential to constant current resonant circuit device connected in the supply circuit between the source and the load, the resonant circuit including a reactor and a condenser, a saturating winding for variably saturating the reactor of said resonant circuit, means connected to the supply circuit to supply current to the saturating winding, a gaseous discharge tube in the last named circuit to control the current to the saturating winding, a control circuit connected to the grid of the tube to control its point of discharge, and a condenser and resistor in parallel in the control circuit whereby the grid of the tube will be biased negative during a discharge cycle of the tube.

5. Electric regulating apparatus for controlling an alternating current supply circuit connected to a variable load comprising a constant potential to constant current resonant circuit device connected in the supply circuit between the source and the load and including a reactor and a condenser, a saturating winding for variably saturating the reactor of said resonant circuit, a transformer having its primary winding connected to the supply circuit, means connecting the mid-point of the transformer secondary winding to one side of the saturating winding, a pair of gaseous discharge tubes connecting the ends of the transformer secondary to the other side of the saturating winding, and a control circuit connected to the supply circuit for alternately discharging the tubes to control the supply of current to the saturating winding.

6. Electric regulating apparatus for controlling an alternating current supply circuit connected to a variable load comprising a constant potential to constant current resonant circuit device connected in the supply circuit between the source and the load and including a reactor and a condenser, a saturating winding for variably saturating the reactor of said resonant circuit, a transformer having its primary winding connected to the supply circuit, means connecting the mid point of the transformer secondary winding to one side of the saturating winding, a pair of gaseous discharge tubes connecting the ends of the transformer secondary to the other side of the saturating winding, a control circuit connected to the supply circuit for alternately discharging the tubes to control the supply of current to the saturating winding, and a rectifier connected across the saturating winding to by-pass inductive kick therefrom.

7. Electric regulating apparatus for controlling an alternating current supply circuit connected to a variable load comprising a constant potential to constant current resonant circuit device connected in the supply circuit between the source and the load and including a reactor and a condenser, a saturating winding for variably saturating the reactor of said resonant circuit, a transformer having its primary winding connected to the supply circuit, means connecting the mid point of the transformer secondary winding to one side of the saturating winding, a pair of gaseous discharge tubes connecting the ends of the transformer secondary to the other side of the saturating winding, a control circuit connected to the tubes alternately to fire them, a phase shift circuit connected to the control circuit, and means responsive to a condition affected by the load to vary the phase shift circuit thereby to shift the phase of the control circuit.

8. Electric regulating apparatus for controlling an alternating current supply circuit connected to a variable load comprising a constant potential to constant current resonant circuit device connected in the supply circuit between the source and the load and including a reactor and a condenser, a saturating winding for variably saturating the reactor of said resonant circuit, a transformer having its primary winding connected to the supply circuit, means connecting the mid point of the transformer secondary winding to one side of the saturating winding, a pair of gaseous discharge tubes connecting the ends of the transformer secondary to the other side of the saturating winding, a control circuit connected to the supply circuit for alternately discharging the tubes to control the supply of current to the saturating winding, a second transformer having its primary supplied with energy from the control circuit and the mid point of its secondary connected to the cathodes of the tubes, and a condenser and resistor in parallel connecting the ends of the transformer secondary to the grids of the tubes respectively.

9. Electric regulating apparatus for controlling an alternating current supply circuit connected to a variable load comprising a constant potential to constant current resonant circuit device connected in the supply circuit between the source and the load and including a reactor and a condenser, a saturating winding for variably saturating the reactor of said resonant circuit, a transformer having its primary winding connected to the supply circuit, means connecting the mid point of the transformer secondary winding to one side of the saturating winding, a pair of gaseous discharge tubes connecting the ends of the transformer secondary to the other side of the saturating winding, a second transformer having its primary connected to the supply circuit at the input side of the resonant circuit, and a control circuit for the tubes including a peaking transformer connected to the mid point and ends of the second transformer secondary to supply sharp control peaks to the tubes.

10. Electric regulating apparatus for controlling an alternating current supply circuit connected to a variable load comprising a constant potential to constant current resonant circuit device connected in the supply circuit between the source and the load and including a reactor and a condenser, a saturating winding for variably saturating the reactor of said resonant circuit, a transformer having its primary winding connected to the supply circuit, means connecting the mid point of the transformer secondary winding to one side of the saturating winding, a pair of gaseous discharge tubes connecting the ends of the transformer secondary to the other side of the saturating winding, a second transformer having its primary connected to the supply circuit at the input side of the resonant circuit, a control circuit for the tubes including a peaking transformer connected to the mid point and ends of the second transformer secondary to supply sharp control peaks to the tubes, a phase shift circuit connected to the control circuit, and means responsive to a condition affected by the load to vary the load on the phase shift circuit thereby to shift the phase of the control peaks.

11. Electric regulating apparatus for controlling an alternating current supply circuit connected to a variable load comprising a constant potential to constant current resonant circuit device connected in the supply circuit between the source and the load and including a reactor and a condenser, a saturating winding for variably saturating the reactor of said resonant circuit, a transformer having its primary winding connected to the supply circuit, means connecting the mid point of the transformer secondary winding to one side of the saturating winding, a pair of gaseous discharge tubes connecting the ends of the transformer secondary to the other side of the saturating winding, a second transformer having its primary connected to the supply circuit at the input side of the resonant circuit, a third transformer having one side of its primary connected to the mid point of the second transformer secondary, a reactor and a resistor connecting the ends respectively of the second transformer secondary to the other end of the third transformer primary, the mid point of the third transformer secondary being connected to the cathodes of the tubes, and connections from the ends of the third transformer secondary to the grids of the tubes respectively.

12. Electric regulating apparatus for controlling an alternating current supply circuit connected to a variable load comprising a constant potential to constant current resonant circuit device connected in the supply circuit between the source and the load and including a reactor and a condenser, a saturating winding for variably saturating the reactor of said resonant circuit, a transformer having its primary winding connected to the supply circuit, means connecting the mid point of the transformer secondary winding to one side of the saturating winding, a pair of gaseous discharge tubes connecting the ends of the transformer secondary to the other side of the saturating winding, a second transformer having its primary connected to the supply circuit at the input side of the resonant circuit, a third transformer having one side of its primary connected to the mid point of the second transformer secondary, a reactor and a resistor connecting the ends respectively of the second transformer secondary to the other end of the third transformer primary, the mid point of the third transformer secondary being connected to the cathodes of the tubes, connections from the ends of the third transformer secondary to the grids of the tubes respectively, condensers across and in series with the last named reactor to form therewith a phase shift circuit, and a resistor connected to the phase shift circuit and variable in response to a condition affected by the load.

EUGENE H. HAUG.

REFERENCES CITED

The following references are of record in the file of this patent:

UNITED STATES PATENTS

| Number | Name | Date |
| --- | --- | --- |
| 2,126,398 | Knowles | Aug. 9, 1938 |
| 2,272,755 | Summers | Feb. 10, 1942 |
| 2,250,207 | Schneider | July 22, 1941 |
| 2,278,151 | Runaldue | Mar. 31, 1942 |

FOREIGN PATENTS

| Number | Country | Date |
| --- | --- | --- |
| 112,071 | Austria | Jan. 25, 1929 |